US012091520B2

(12) United States Patent
Seo et al.

(10) Patent No.: US 12,091,520 B2
(45) Date of Patent: Sep. 17, 2024

(54) COMPOSITION FOR OPTICAL FILM, OPTICAL FILM AND DISPLAY DEVICE COMPRISING THE SAME

(71) Applicant: LG CHEM, LTD., Seoul (KR)

(72) Inventors: Jung Hyun Seo, Daejeon (KR); Intaek Song, Daejeon (KR); Seungha Kim, Daejeon (KR); Soree Kim, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 694 days.

(21) Appl. No.: 17/269,166

(22) PCT Filed: Mar. 4, 2020

(86) PCT No.: PCT/KR2020/003070
§ 371 (c)(1),
(2) Date: Feb. 17, 2021

(87) PCT Pub. No.: WO2020/180109
PCT Pub. Date: Sep. 10, 2020

(65) Prior Publication Data
US 2021/0324165 A1  Oct. 21, 2021

(30) Foreign Application Priority Data

Mar. 7, 2019 (KR) .................... 10-2019-0026502
Mar. 3, 2020 (KR) .................... 10-2020-0026667

(51) Int. Cl.
*C08J 7/04* (2020.01)
*C09D 7/20* (2018.01)
(Continued)

(52) U.S. Cl.
CPC .............. *C08J 7/0427* (2020.01); *C09D 7/20* (2018.01); *C09D 7/65* (2018.01); *C09D 133/14* (2013.01); *G02B 1/04* (2013.01); *C09D 133/06* (2013.01)

(58) Field of Classification Search
CPC ................... C09D 7/20; C09D 7/65
See application file for complete search history.

(56) References Cited

U.S. PATENT DOCUMENTS 7,524,553 B2  4/2009  Yoneyama et al.
8,899,770 B2  12/2014 Han et al.
(Continued)

FOREIGN PATENT DOCUMENTS

CN  101257980 A  9/2008
CN  107109101 A  8/2017
(Continued)

OTHER PUBLICATIONS

Machine translation of KR101750629B1, retrieved Aug. 26, 2023. (Year: 2017).*
(Continued)

*Primary Examiner* — Vu A Nguyen
(74) *Attorney, Agent, or Firm* — ROTHWELL, FIGG, ERNST & MANBECK, P.C.

(57) ABSTRACT

The present disclosure relates to a composition comprising: a solvent screened using a solvent-polymer particle interaction parameter $\alpha_{Pi}$ and a solvent-(meth)acrylate binder interaction parameter $\alpha_{Bi}$, polymer particles, and a (meth)acrylate binder, and an optical film and a display device comprising the same.

11 Claims, 1 Drawing Sheet

(51) Int. Cl.
*C09D 7/65* (2018.01)
*C09D 133/06* (2006.01)
*C09D 133/14* (2006.01)
*G02B 1/04* (2006.01)

(56) References Cited

U.S. PATENT DOCUMENTS

| | | |
|---|---|---|
| 2006/0074172 A1 | 4/2006 | Yang et al. |
| 2006/0221451 A1 | 10/2006 | Ohishi et al. |
| 2011/0085115 A1* | 4/2011 | Tochigi ............... G02B 5/3025 427/532 |
| 2013/0258481 A1 | 10/2013 | Fukuda et al. |
| 2017/0299777 A1 | 10/2017 | Park et al. |
| 2018/0305587 A1 | 10/2018 | Park et al. |
| 2019/0225831 A1 | 7/2019 | Seo et al. |
| 2020/0056976 A1 | 2/2020 | Kim et al. |

FOREIGN PATENT DOCUMENTS

| | | |
|---|---|---|
| CN | 107849262 A | 3/2018 |
| CN | 108663732 A | 10/2018 |
| JP | H11-209717 A | 8/1999 |
| JP | 2006-018233 A | 1/2006 |
| JP | 2009-057533 A | 3/2009 |
| JP | 5434923 B2 | 3/2014 |
| KR | 10-2012-0078616 A | 7/2012 |
| KR | 10-2015-0041417 A | 4/2015 |
| KR | 10-2015-0044233 A | 4/2015 |
| KR | 10-2016-0038753 A | 4/2016 |
| KR | 10-1750629 B1 | 6/2017 |
| KR | 10-2018-0070494 A | 6/2018 |
| KR | 10-2019-0019437 A | 2/2019 |
| KR | 10-2020-0018129 A | 2/2020 |
| WO | 2004-027517 A2 | 4/2004 |
| WO | 2018-110949 A1 | 6/2018 |

OTHER PUBLICATIONS

Extended European Search Report dated Aug. 16, 2021, of the corresponding European Patent Application No. 20766008.5, 12 pages.

Tukur, et al., "Predicting Solubilities in Polymer Systems Using COSMO-RS." The 2005 Annual Meeting. 2005. 18 pages.

Loschen et al., "Prediction of Solubilities and Partition Coefficients in Polymers Using COSMO-RS." Industrial & Engineering Chemistry Research, vol. 53, No. 28, Jul. 7, 2014, pp. 11478-11487.

Kuo et al., "Prediction of Phase Behaviors of Polymer-Solvent Mixtures from the COSMO-SAC Activity Coefficient Model." Industrial & Engineering Chemistry Research, vol. 52, No. 37, Sep. 9, 2013, pp. 13505-135.

Andreas Klamt, "The COSMO and COSMO-RS solvation models." Computational Molecular Science, vol. 8, No. 1, Sep. 28, 2017. 11 pages.

International Search Report issued for International Application No. PCT/KR2020/003070 on Jun. 30, 2020, 4 pages.

Ivet Bahar et al., "Determination of polymer-solvent interaction parameter from swelling of networks: the system poly(2-hydroxyethyl methacrylate)-diethylene glycol", Macromolecules, (1987) vol. 20, pp. 1353-1356.

Andreas Klamt, "The COSMO and COSMO-RS solvation models", John Wiley & Sons, Ltd., WIREs Computational Molecular Science, 2011, vol. 1, Issue 5, pp. 699-709.

* cited by examiner

COMPOSITION FOR OPTICAL FILM, OPTICAL FILM AND DISPLAY DEVICE COMPRISING THE SAME

CROSS-REFERENCE TO RELATED APPLICATION(S)

This application is a 35 U.S.C. 371 National Phase Entry Application from PCT/KR2020/003070, filed on Mar. 4, 2020, designating the United States, which claims priority to and the benefit of Korean Patent Application No. 10-2019-0026502 filed on Mar. 7, 2019 and Korean Patent Application No. 10-2020-0026667 filed on Mar. 3, 2020 in the Korean Intellectual Property Office, the disclosures of which are incorporated herein by reference in their entirety.

FIELD OF THE INVENTION

The present disclosure relates to a composition for an optical film, an optical film and a display device comprising the same. More specifically, the present disclosure relates to a composition for an optical film comprising a solvent screened using an interaction parameter, polymer particles, and a (meth)acrylate binder, an optical film and a display device comprising the same.

BACKGROUND OF THE INVENTION

In a display device such as an organic light emitting device (OELD) or a liquid crystal display (LCD), it is required to prevent a decrease in contrast due to a reflection of external light or a reflection of an image, and a deterioration of the visibility. For this purpose, in order to reduce a reflection of an image and a reflection of light by using scattering of light or optical interference, an optical film is formed on the surface of the display device.

For example, in a liquid crystal display or the like, antiglare films have been formed since before. The composition for producing these antiglare films includes a binder, polymer fine particles, inorganic fine particles, solvents, additives and the like.

However, if the solvent remains in the film without being completely dried in the antiglare film which is a cured product of the composition, a swelling phenomenon may occur in which polymer particles, that is, polymers undergo swelling. Specifically, when polymers are exposed to a solvent, they undergo swelling by increasing the weight and volume of the polymer due to the penetration of solvent molecules into spaces between polymer chains. Because the swelling phenomenon of a polymer in a solvent greatly varies depending on various factors including polymer structures, molecular weights, molecular weight distribution, solvent properties, etc., there have been no methods of clearly predicting the polymer swelling phenomenon until now, and a method of experimentally testing several solvents and selecting a suitable solvent for the polymer is used.

The swelling phenomenon of a polymer in a solvent is an important factor for evaluating the properties of the polymer particles and a composition containing the same. Therefore, if the swelling can be accurately predicted and evaluated, it is expected to be very useful for improving the physical properties of the polymer and the composition containing the same.

Meanwhile, Korean Unexamined Patent Publication No. 2015-0041417 discloses a Swelling Band which is a method for comprehensively and quantitatively evaluating the swelling properties that a polymer can exhibit in a solvent, using a Solvent-Polymer Swelling Parameter (S-PSP) which is a new method developed to quantitatively evaluating the swelling phenomenon in which a solvent permeates into a polymer using the value obtained by adjusting a Hansen solubility parameter of solvents.

However, the method using the Hansen solubility parameter is a thermodynamic approach and is based on a simple methodology that ignores specific interactions of polymers. Therefore, there are reports that the interaction between molecules is inaccurate compared to the methodology based on quantum computation. In addition, in the above method, only the polymer swelling in solvents can be predicted, and the interaction with the acrylic binder was not considered.

Further, Japanese Unexamined Patent Publication No. 2009-057533 discloses a method for predicting a saturated swelling amount when a polymer resin is immersed in a two-component mixed drug solution, by using a Flory-Huggins interaction parameter, an interaction parameter between the first and second components of the mixed drug solution, an interaction parameter between the first component of the mixed drug solution and the resin, and an interaction parameter between the second component of the mixed drug solution and the resin.

The method also only deals with the swelling of polymer particles in a mixed solvent, and screening based on the interaction with the acrylic binder was not considered.

Further, when a composition is prepared by contacting the polymer particles present in the binder with a solvent, the swelling degree of polymer particles cannot be accurately predicted by only the swelling properties of the solvent and the polymer particles, and thus, a swelling measurement method suitable for such a polymer particle-binder-solvent system, and a screening method of a solvent are needed.

SUMMARY OF THE INVENTION

The present disclosure has been designed to solve the problems of the prior arts as described above, and provides a composition comprising an optimal solvent that allows the polymer particles present in the binder to have an appropriate swelling degree by screening a solvent using a solvent-polymer particle interaction parameter and a solvent-binder interaction parameter, an optical film and a display device including a cured product thereof.

One aspect of the present disclosure provides a composition comprising polymer particles, a (meth)acrylate binder and a solvent, wherein the solvent includes a solvent screened using a solvent-polymer particle interaction parameter $\alpha_{Pi}$ and a solvent-(meth)acrylate binder interaction parameter $\alpha_{Bi}$.

Another aspect of the present disclosure provides a method for preparing a composition comprising the steps of: screening a solvent using a solvent-polymer particle interaction parameter $\alpha_{Pi}$ and a solvent-(meth)acrylate binder interaction parameter $\alpha_{Bi}$ and preparing a composition including the screened solvent, polymer particles and a (meth)acrylate binder.

Yet another aspect of the present disclosure provides an optical film and a display device comprising a cured product of the above-mentioned composition.

ADVANTAGEOUS EFFECTS

According to the present disclosure, the swelling degree of polymer particles in solvents, with the polymer particles being present in the (meth)acrylate binder contained in a composition for an optical film, can be quantitatively predicted using a solvent-polymer particle interaction parameter and a solvent-binder interaction parameter.

More specifically, in a composition which is a three-component based system comprising solvent-polymer particle-binder, the amount of increase in the volume or weight of the polymer particles and the binder generated by the swelling phenomenon can be predicted using the solvent-polymer particle interaction parameter and the solvent-binder interaction parameter, and the screened solvent suitable for the polymer particles and binder may be included.

Therefore, the composition according to the present disclosure can accurately evaluate the swelling phenomenon of polymer particles in solvents, which has a great influence on the properties, without experimentation, thereby allowing a suitable solvent to contain therein.

DETAILED DESCRIPTION OF THE INVENTION

As used herein, terms such as first, second, and the like may be used to describe various components, and the terms are used only to discriminate one constituent element from another component.

As used herein, the (meth)acrylate is meant to include both acrylate and methacrylate.

As used herein, the (co)polymer is meant to include both a co-polymer and a homo-polymer.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Since a variety of modification may be made to the present disclosure and there may be various forms of the present disclosure, specific examples are illustrated and will be described in detail below, However, it should be understood that this is not intended to limit the present disclosure to particular forms disclosed herein, and the invention is to cover all modifications, equivalents, or alternatives falling within the spirit and technical scope of the present disclosure.

Hereinafter, a composition according to the present disclosure, an optical film and a display device including a cured product thereof will be described in detail.

The composition for an optical film according to one embodiment of the present disclosure comprises polymer particles, a (meth)acrylate binder and a solvent, wherein the solvent includes a solvent screened using a calculated solvent-polymer particle interaction parameter $\alpha_{Pi}$ and a calculated solvent-(meth)acrylate binder interaction parameter $\alpha_{Bi}$.

When polymers are exposed to a solvent, a swelling phenomenon may occur in which they undergo swelling due to the penetration of solvent molecules into spaces between polymer chains. Due to this swelling phenomenon, the volume or weight of polymer particles is increased in the composition including the solvent and the polymer particles, which greatly affects the properties of the composition. The change in properties of the composition due to the swelling phenomenon of polymer particles may occur in various situations such as coating, semiconductor packaging, membrane separation, lithography, and drug release control system, which may thus be problematic.

Factors affecting the swelling phenomenon of polymer particles include various factors such as temperature, pH, degree of crosslinking of polymer particles, structure of polymer particles, molecular weight, molecular weight distribution, and type of solvent. In particular, when polymer particles are present in the (meth)acrylate binder, the swelling degree of polymer particles may vary greatly depending on the solvent.

For example, it is provided for use in forming an optical film. In a composition including polymer particles, a (meth)acrylate binder, and a solvent, if polymer particles are not properly swelled, a fine void is created between the binder and the polymer particles in the coating layer, which causes a problem that the haze of the final film is increased. Specifically, haze is greatly affected by high temperature and high humidity conditions. As a fine void is created between the binder and the polymer particles, there is a problem in that the haze variation before and after high temperature and high humidity conditions greatly increases. On the other hand, when the polymer particles are excessively swelled, the dispersibility becomes low, or coupling or aggregation between particles may be increased to make the coated surface uneven. Therefore, in order to control the properties of the composition, there is a need for a method capable of accurately evaluating and predicting the swelling phenomenon of the polymer particles in solvents.

Therefore, the present inventors have found that a solvent-polymer particle interaction parameter and a solvent-(meth)acrylate binder interaction parameter are calculated by using the mixing energy of the solute to the solvent, and through these two interaction parameters, a solvent that allows the polymer particles present in the (meth)acrylate binder to swell to a desired degree can be screened without experimentation, thereby completing the present disclosure.

More specifically, the solvent-polymer particle interaction parameter $\alpha_{Pi}$ can be defined by the following Equation 1:

$$\alpha_{Pi} \equiv \sum_{j=1}^{N_P} a_j \Delta \mu_{ji}^s \qquad \text{[Equation 1]}$$

in the Equation 1, $N_P$ means the number of types of polymers constituting the polymer particles, $a_j$ means the ratio of the weight of each polymer particle to the weight of the entire polymer particles, $\Delta\mu_{ji}$ means the mixing energy of the solvent I to the polymer particles j, and $\Delta\mu^s_{ji}$ is the standardized value of the $\Delta\mu_{ji}$, and can be represented by the following Equation 1-1:

$$\Delta\mu^s_{ji}=(\Delta\mu_{ji}-M_j)/\sigma_j \qquad \text{[Equation 1-1]}$$

in the Equation 1-1, $\Delta\mu_{ji}$ means the mixing energy of the solvent I to the polymer particles j, $M_j$ means the average of the $\Delta\mu_{ji}$, and $\sigma_j$ means the standard deviation of the $\Delta\mu_{ji}$.

Similarly, the solvent-(meth)acrylate binder interaction parameter $\alpha_{Bi}$ can be defined by the following Equation 2:

$$\alpha_{Bi} \equiv \sum_{k=1}^{N_B} a_k \Delta\mu_{ki}^s \quad \text{[Equation 2]}$$

in the Equation 2, $N_B$ means the number of types of (meth)acrylate binders,
$a_k$ means the ratio of the weight of each (meth)acrylate binder to the weight of the entire (meth)acrylate binder,
$\Delta\mu_{ki}$ means the mixing energy of the solvent I to the (meth)acrylate binder k, and
$\Delta\mu^s_{ki}$ is the standardized value of the $\Delta\mu$ki, and is represented by the following Equation 2-1:

$$\Delta\mu^s_{ki} = (\Delta\mu_{ki} - M_k)/\sigma_k \quad \text{[Equation 2-1]}$$

in the Equation 2-1, $\Delta\mu_{ki}$ means the mixing energy of the solvent I to the (meth)acrylate binder k,
$M_k$ means the average of the $\Delta\mu_{ki}$, and
$\sigma_k$ means the standard deviation of the $\Delta\mu_{ki}$.

In the Equations 1 and 2, the mixing energy of the solvent to the polymer particles and the mixing energy of the solvent to the (meth)acrylate binder mean values calculated using a COSMO-RS theory. For more information, please refer to John Wiley & Sons, Ltd. WIREs Computational Molecular Science, 2011, Vol. 1, Issue 5, pp 699-709 (DOI: 10.1002/wcms.56), which is incorporated by reference.

Meanwhile, the behavior can be observed by dissolving the polymer particles and the (meth)acrylate binder in each solvent at a predetermined concentration. For example, about 3 to 10% by weight of polymer particles are added to each solvent and mixed for about 3 minutes. After that, when the solution is observed, the precipitation rate varies depending on the type of polymer particles, and some solvents allow the polymer particles to swell at a high rate and confirms that aggregation between polymer particles is formed, thereby screening an appropriate solvent. This difference in behavior may represent a correlation with the above-mentioned solvent-polymer particle interaction parameter $\alpha_{Pi}$.

Meanwhile, after a (meth)acrylate binder is added and mixed to each solvent at a predetermined concentration, the behavior can be observed in the same manner as in the above method. However, because the (meth)acrylate binder itself is transparent or hardly precipitates, it is difficult to observe the behavior of the (meth)acrylate binder in the solvent, and thus there is a problem that it is not possible to screen an appropriate solvent.

However, in the composition for an optical film according to the one embodiment, even if the (meth)acrylate binder and polymer particles are not directly added to the solvent, the solvent-polymer particle interaction parameter $\alpha_{Pi}$ is calculated from Equation 1, and the solvent-(meth)acrylate binder interaction parameter $\alpha_{Bi}$ is calculated from Equation 2. By screening a solvent having $\alpha_{Pi}$ located between respective $\alpha_{Pi}$ values of two different reference solvents, and $\alpha_{Bi}$ located between respective $\alpha_{Bi}$ values of two different reference solvents, it is possible to find a suitable solvent for the (meth)acrylate binder and the polymer particles.

The solvent-polymer particle interaction parameter $\alpha_{Pi}$ of the screened solvent contained in the composition may be −0.50 to 0.50, −0.45 to 0.45, or −0.40 to 0.40. Further, the solvent-(meth)acrylate binder interaction parameter $\alpha_{Bi}$ of the screened solvent contained in the composition may be −0.10 to 0.20, −0.05 to 0.15, or −0.03 to 0.13.

When the value of $\alpha_{Pi}$ of the screened solvent is too large, the penetration of the solvent into the surface of polymer particles appears strongly, and the polymer particles can be dissolved or the size can be reduced. When the value of $\alpha_{Pi}$ is too small, the solvent does not penetrate into the surface of polymer particles, and thus deformation may occur between the polymer particles and the (meth)acrylate binder by air and moisture.

Meanwhile, when the value of $\alpha_{Bi}$ of the screened solvent is too small, the solvent-binder mixing is insufficient, so that the binder may be unevenly distributed in the cured product. When the value of $\alpha_{Bi}$ is too large, the interaction between the binder and the polymer particles may be deteriorated, so the aggregation of polymer particles may not be exhibited.

Further, the screened solvent may include at least one selected from the group consisting of diisopropyl ether, 2-methyl-2-butanol, diethylmethylamine, benzene, and trichloroethene.

Meanwhile, the selected two reference solvents are not particularly limited as long as they are those included in the composition for an optical film and a hard coating layer, and it can be selected as two types of solvents having completely different extent to which the polymer particles or (meth)acrylate binder are dispersed/dissolved in the solvent. Specifically, among the solvents having a large difference in the solvent-polymer particle interaction parameter $\alpha_{Pi}$, two solvents having a large difference in the solvent-(meth)acrylate binder interaction parameter $\alpha_{Bi}$ may also be selected. Since two solvents having a large difference in am and $\alpha_{Bi}$ are selected as the reference solvents, it is possible to select various solvent candidate groups even among the solvents having a large difference in behavior with respect to polymer particles. Further, among solvents having a large difference in $\alpha_{Pi}$, since two solvents having a large difference in $\alpha_{Bi}$ are selected as the reference solvents, the chances of finding a solvent with a larger or smaller interaction between the polymer particles and the solvent than the interaction between the (meth)acrylate binder and the solvent can be increased. Solvents which are large or small in the interaction between a binder and a solvent and/or interaction between polymer particles and a solvent are screened by using two solvents having a large difference in $\alpha_{Pi}$ and $\alpha_{Bi}$ as reference solvents, and these screened solvents is allowed to contain in the composition, thus inducing proper mixing between the polymer particles and the binder and making the aggregation of polymer particles uniform. In particular, aggregates of polymer particles are formed so as not to be too small or too large, and the binding between the binder and the polymer particle surface can be easily achieved by the solvent penetrated into the surface of polymer particles.

On the other hand, the reference solvent may include, but not limited thereto, for example, two types selected from the group consisting of toluene, 2-butanol, n-butanol, methanol, ethanol, isopropyl alcohol, methyl ethyl ketone, methyl isobutyl ketone, ethyl acetate, tetrahydrofuran, propylene glycol methyl ether acetate, diisopropyl ether, 2-methyl-2-butanol, diethylmethylamine, benzene, trichloroethene and propylene glycol methyl ether.

For example, in the case of toluene and 2-butanol, since the values of the mixing energy of polymer particles-toluene (interaction parameter) and the mixing energy of polymer particles-2-butanol (interaction parameter) exhibit a large difference, the toluene and 2-butanol may be selected as reference solvents. Therefore, when the selected two reference solvents are toluene and 2-butanol, it is possible to screen a solvent in which the value of $\alpha_{Pi}$ is located between $\alpha_{Pi}$ of toluene and am of 2-butanol, and the value of $\alpha_{Bi}$ is located between $\alpha_{Bi}$ of toluene and ail of 2-butanol, thereby allowing the screened solvent to contain in the composition.

Figure 1:
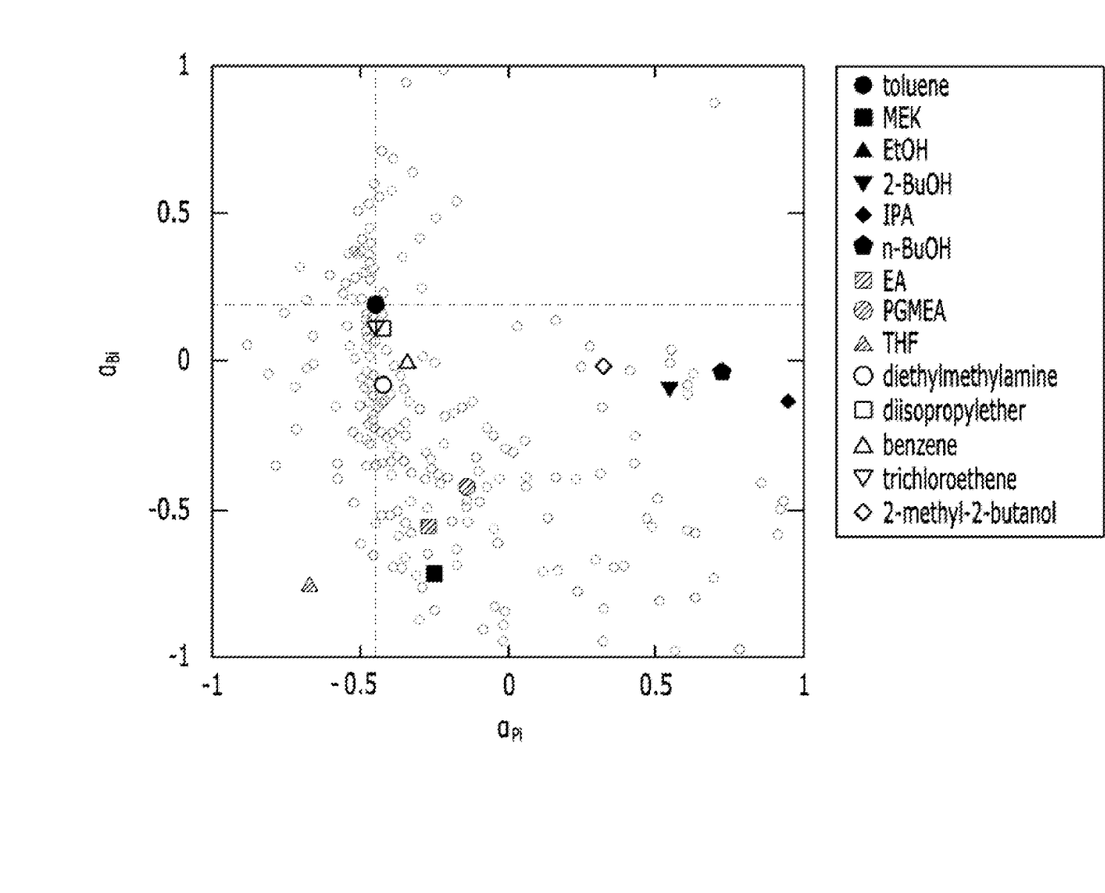
FIG. 1 is a graph schematically illustrating a solvent-polymer particle interaction parameter, and a solvent-binder interaction parameter.

FIG. 1 is a graph schematically illustrating a solvent-polymer particle interaction parameter calculated from Equation 1, and a solvent-binder interaction parameter calculated from Equation 2. A binder in which 2-hydroxyethyl acrylate and trimethylolpropane triacrylate are mixed in a ratio of 1:1 is used as the (meth)acrylate binder, and 113BQ (manufactured by Sekisui Plastic) is used as the polymer particles to calculate the solvent-polymer particle interaction parameter and the solvent-binder interaction parameter, and these are illustrated according to solvents.

Through the graph in which the interaction parameters are respectively illustrated as in FIG. 1, it is possible to screen a solvent in which $\alpha_{Pi}$ and $\alpha_{Bi}$ values are located between a solvent-polymer particle interaction parameter and a solvent-binder interaction parameter of each of toluene and 2-butanol as the reference solvents.

The composition according to the one embodiment, essentially including the screened solvent, has an advantage in that the solubility of the polymer particles is high and the solubility of the (meth)acrylate binder in the solvent is high. Further, the composition can exhibit a remarkably high solubility of the polymer particles and the (meth)acrylate binder, even compared to a composition containing at least one of the selected two reference solvents. Further, this solvent screening method has an advantage that can be utilized even when the behavior of the (meth)acrylate binder in the solvent cannot be observed.

In addition, the composition including the screened solvent, polymer particles and (meth)acrylate binder can accurately evaluate and predict the swelling phenomenon and the like to exhibit the properties of the desired composition. In particular, it is possible to select solvents that allow the polymer particles contained in the (meth)acrylate binder either to swell better or to swell less than the reference solvent, thereby precisely adjusting the swelling properties of the composition. The composition including the solvent thus selected and the optical film including a cured product thereof prevents a decrease in contrast or a decrease in visibility, and thus improves optical properties. In particular, the haze variation before and after high temperature and high humidity conditions can be controlled to be low.

The solvent screened using the solvent-polymer particle interaction parameter $\alpha_{Pi}$ and the solvent-(meth)acrylate binder interaction parameter $\alpha_{Bi}$ may have a boiling point of 68.5 to 150° C., 70 to 150° C., 80 to 140° C., or 90 to 130° C. The screened solvent satisfying the above-mentioned boiling point has excellent coating properties because the solvent volatilizes properly in the drying oven when coating a thin film of 30 μm or less, and the polymer particles can be appropriately distributed in the (meth)acrylate binder, thus exhibiting excellent optical properties.

The composition according to the one embodiment may further include a solvent generally used in a coating composition in addition to the screened solvent. Examples of the solvent may include at least one selected from the group consisting of lower alcohols having 1 to 6 carbon atoms, acetates, ketones, cellosolves, dimethylformamide, tetrahydrofuran, propylene glycol monomethyl ether, toluene and xylene. These solvents may be used alone or in mixture of at least two.

At this time, examples of the lower alcohols may be methanol, ethanol, butanol, isopropyl alcohol, butyl alcohol, isobutyl alcohol, diacetone alcohol, etc., but the present disclosure is not limited to the above-described examples. And, examples of the acetates may be methyl acetate, ethyl acetate, isopropyl acetate, butyl acetate, or cellosolve acetate, and examples of the ketones may be methyl ethyl ketone, methyl isobutyl ketone, acetylacetone or acetone, but the present disclosure is not limited to the above-described examples.

More specifically, the composition may further include at least one of two reference solvents.

As the composition further comprises a solvent such as a reference solvent in addition to the screened solvent, it is possible to prevent deterioration of optical properties due to excessive expression of aggregation of polymer particles, and it is possible to prevent the problem of peeling due to the decrease in adhesion of the coating film, which is a cured product of the composition.

The polymer particles included in the composition according to the one embodiment are not particularly limited thereto, and can be used without limitation as long as it is a polymer that can be used in the coating composition. As a non-limiting example, the polymer particles may include polyolefin-based, acrylate-based, polyurethane-based, polyether-based, polyester-based, polyamide-based, formaldehyde-based and silicone-based polymers, or a copolymer formed from two or more monomers of these polymers, and a combination of two or more of the above polymers may also be included. Examples thereof may include polyethylene (PE), polyvinylfluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), ethylene vinyl acetate (EVA), polymethyl methacrylate (PMMA), poly(l-butene), poly(4-methylpentene), polystyrene, polyvinylpyridine, polybutadiene, polyisoprene, polychloroprene, styrene-acrylonitrile copolymer (SAN), styrene-acrylate copolymer, styrene-methacrylate copolymer, styrene-methylmethacrylate copolymer, acrylonitrile-butadiene-styrene terpolymer, ethylene-methacrylic acid copolymer, styrene-butadiene rubber, nitrile rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resin, polyphenylene oxide, polyethylene terephthalate, polybutylene terephthalate, polydihydroxymethylcyclohexyl terephthalate, cellulose ester, polycarbonate, polyamide, polyimide, polyarylene, and the like, but the present disclosure is not limited thereto. These polymers may be included alone or in combination of different types.

Further, the (meth)acrylate binder contained in the composition is not particularly limited, and can be used without limitation as long as it is a (meth)acrylate binder that can be used in the coating composition. Examples of the (meth)acrylate binder may include (meth)acrylate-based monomers, (meth)acrylate-based oligomers or (co)polymers of (meth)acrylate-based monomers, and the like. The (meth)acrylate binders may be used alone or in combination with different types.

The (meth)acrylate-based monomer or oligomer may be a monomer or oligomer containing one or more, two or more, or three or more (meth)acrylate groups, and examples thereof may include hydroxyethyl (meth)acrylate, hexanediol di(meth)acrylate, butanediol di(meth)acrylate, hexaethyl (meth)acrylate, butyl (meth)acrylate, tripropylene glycol di(meth)acrylate, ethylene glycol di(meth)acrylate, trimethylolpropane tri(meth)acrylate, trimethylolpropaneethoxy tri(meth)acrylate, glycerin propoxylated tri(meth)

acrylate, pentaerythritol tetra(meth)acrylate, pentaerythritol tri(meth)acrylate, dipentaerythritol penta(meth)acrylate, dipentaerythritol hexa(meth)acrylate, tripentaerythritol hepta(meth)acrylate and a mixture of two or more thereof, or urethane modified acrylate oligomer, epoxide acrylate oligomer, ether acrylate oligomer, dendritic acrylate oligomer, or a mixture of two or more thereof. At this time, the molecular weight of the oligomer may be 1,000 to 200,000.

Further, the polymer or copolymer of the (meth)acrylate-based monomer may further include a part derived from one or more monomers selected from a reactive acrylate oligomer group consisting of urethane acrylate oligomer, epoxy acrylate oligomer, polyester acrylate, and polyether acrylate; and a polyfunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate.

Further, the composition according to the one embodiment may further include a vinyl-based monomer, a vinyl-based oligomer, or a (co)polymer of the vinyl-based monomer as a binder, in addition to the (meth)acrylate binder. The vinyl-based monomer or oligomer may be a monomer or oligomer containing 1 or more, 2 or more, or 3 or more vinyl groups, and for example, the vinyl-based monomer may be divinylbenzene, styrene or paramethylstyrene.

According to another embodiment of the present disclosure, there is provided a method for preparing a composition comprising the steps of: screening a solvent using the solvent-polymer particle interaction parameter $\alpha_{Pi}$ and the solvent-(meth)acrylate binder interaction parameter $\alpha_{Bi}$; and preparing a composition comprising the screened solvent, polymer particles, and a (meth)acrylate binder.

The screened solvent may be screened by the method as described above, and an appropriate solvent can be screened according to the intended use, characteristics, etc. of the composition. Specifically, in the method for preparing the composition, due to the use of a solvent screened using the solvent-polymer particle interaction parameter $\alpha_{Pi}$ and the solvent-(meth)acrylate binder interaction parameter $\alpha_{Bi}$, it is possible to accurately evaluate the swelling phenomenon of polymer particles in solvents without experimentation, and screen an appropriate solvent, thereby allowing it to contain in the composition.

On the other hand, the polymer particles and the (meth)acrylate binder that can be used in the method for preparing the composition according to the other embodiment may be of the same type as described with regard to the above composition.

According to another embodiment of the present disclosure, there can be provided an optical film comprising a cured product of the above-mentioned composition.

Since the composition includes a solvent screened using the solvent-polymer particle interaction parameter $\alpha_{Pi}$ and the solvent-(meth)acrylate binder interaction parameter $\alpha_{Bi}$, the optical film containing the cured product of the composition can predict the amount of increase in the volume or weight of the polymer particles and binder generated by the swelling phenomenon even if the solvent is not completely dried inside the film and remains. In particular, it is possible to accurately evaluate the swelling phenomenon of polymer particles in solvents without experimentation so that the appropriate solvent can be contained.

In addition, the optical film including the cured product of the composition may exhibit a low haze variation even under high temperature and high humidity conditions. Specifically, the optical film may have a haze variation (ΔH) according to the following Equation 3 of 0.4% or less, 0.3% or less, 0.2% or less, or 0.1% or less.

$$\Delta H\ (\%) = |Hf - Hi| \quad \text{[Equation 3]}$$

in the Equation 3,

Hf is the haze of the optical film after maintaining at a temperature of 85° C. and a humidity of 85% for 24 hours, and Hi is the haze of the optical film before being maintained at high temperature and humidity.

The optical film according to another embodiment may have a thickness of 1 to 100 μm, 2 to 90 μm, 3 to 80 μml, or 4 to 70 μm.

According to another embodiment of the present disclosure, there can be provided a display device comprising the above-mentioned optical film.

Due to the excellent optical properties of the optical film, it is possible to prevent a decrease in contrast or a decrease in visibility due to reflection of external light or reflection of an image in a display device including the above-described optical film.

A specific example of the display device is not limited, and for example, it may be a device such as a liquid crystal display device, a plasma display device, or an organic light emitting diode device.

As an example, the display device may be a liquid crystal display device including: a pair of polarizing plates facing each other; a thin film transistor, a color filter and a liquid crystal cell sequentially stacked between the pair of polarizing plates; and a backlight unit.

In the display device, the optical film may be provided on the outermost surface of a display panel facing an observer or on the outermost surface thereof facing a backlight.

In a display device including the optical film, an optical film may be positioned on one surface of a polarizing plate that is relatively far from a backlight unit in a pair of polarizing plates.

In addition, the display device may include a display panel, a polarizer provided on at least one side of the panel, and an optical film provided on a side opposite to the side in contact with the panel of the polarizer.

Hereinafter, the present disclosure will be described in more detail based on examples, but the examples of the present disclosure are illustrative only, and the scope of the present disclosure is not limited to these examples.

EXAMPLE

Examples 1 and 2

(10) Solvent Screening

When polymer particles consisting of polystyrene (PS) and polymethyl methacrylate (PMMA) in a weight ratio of 1:2 were present in the acrylate binders A, B, C, and D of Table 1 below, respectively, solvent-polymer particle interaction parameter $\alpha_{Pi}$ and solvent-binder interaction parameter $\alpha_{Bi}$ were calculated by the following Equations 1 and 2.

TABLE 1

|  | Acrylate binder A | Acrylate binder B | Acrylate binder C | Acrylate binder D |
|---|---|---|---|---|
| Hydroxyethyl methacrylate (HEMA) | 2.56 | 5.12 | 2.87 | 5.12 |
| Pentaerythritol triacrylate (PETA) | 2.56 | — | 2.87 | — |
| Trimethylolpropane triacrylate (TMPTA) | — | 10.44 | 10.60 | — |
| 11064A | 10.44 | — | 4.41 | 10.44 |
| Dipentaerythritol hexaacrylate (DPHA) | 10.44 | 10.44 | 5.41 | 10.44 |

$$\alpha_{Pi} \equiv \sum_{j=1}^{N_P} a_j \Delta\mu_{ji}^s \qquad \text{[Equation 1]}$$

in the Equation 1, $N_P$ means the number of types of polymers constituting the polymer particles, $a_j$ means the ratio of the weight of each polymer particle to the weight of the entire polymer particles, $\Delta\mu_{ji}$ means the mixing energy of the solvent I to the polymer particles j, and $\Delta\mu_{ji}^s$ is the standardized value of the $\Delta\mu_{ji}$, and is represented by the following Equation 1-1:

$$\Delta\mu_{ji}^s = (\Delta\mu_{ji} - M_j)/\sigma_j \qquad \text{[Equation 1-1]}$$

in the Equation 1-1, $\Delta\mu_{ji}$ means the mixing energy of the solvent I to the polymer particles j, $M_j$ means the average of the $\Delta\mu_{ji}$, and $\sigma_j$ means the standard deviation of the $\Delta\mu_{ji}$.

$$\alpha_{Bi} \equiv \sum_{k=1}^{N_B} a_k \Delta\mu_{ki}^s \qquad \text{[Equation 2]}$$

in the Equation 2, $N_B$ means the number of types of (meth)acrylate binders, $a_k$ means the ratio of the weight of each (meth)acrylate binder to the weight of the entire (meth)acrylate binder, $\Delta\mu_{ki}$ means the mixing energy of the solvent I to the (meth)acrylate binder k, and $\Delta\mu_{ki}^s$ is the standardized value of $\Delta\mu_{ki}$, and is represented by the following Equation 2-1:

$$\Delta\mu_{ki}^s = (\Delta\mu_{ki} - M_k)/\sigma_k \qquad \text{[Equation 2-1]}$$

in the Equation 2-1, $\Delta\mu_{ki}$ means the mixing energy of the solvent I to the (meth)acrylate binder k, $M_k$ means the average of the $\Delta\mu_{ki}$, and $\sigma_k$ means the standard deviation of the $\Delta\mu_{ki}$.

Meanwhile, because the types of acrylate binders are different, the solvent-acrylate binder A interaction parameter is referred to as $\alpha_{Bi(A)}$, the solvent-acrylate binder B interaction parameter is referred to as $\alpha_{Bi(B)}$, and the solvent-acrylate binder C interaction parameter is referred to as $\alpha_{Bi(C)}$, the solvent-acrylate binder D interaction parameter is referred to as $\alpha_{Bi(D)}$, of which the calculated solvent-polymer particle interaction parameter $\alpha_{Pi}$ and the solvent-acrylate binder A interaction parameter $\alpha_{Bi(A)}$ are shown in Table 2 below.

TABLE 2

| Solvent | $\alpha_{Pi}$ | $\alpha_{Bi(A)}$ |
|---|---|---|
| Toluene (reference solvent) | −0.45 | 0.19 |
| Trichloroethene | −0.45 | 0.12 |
| Diisopropyl ether | −0.43 | 0.11 |
| Diethylmethylamine | −0.43 | −0.08 |
| Benzene | −0.34 | −0.01 |
| 2-Methyl-2-butanol | 0.32 | −0.02 |
| 2-Butanol (reference solvent) | 0.55 | −0.09 |

Subsequently, toluene and 2-butanol were used as reference solvents. A solvent group A having a boiling point of 110° C. or less while the values of $\alpha_{Pi}$ and $\alpha_{Bi(A)}$ were located between respective $\alpha_{Pi}$ and between respective $\alpha_{Bi(A)}$ of toluene and 2-butanol was screened; a solvent group B having a boiling point of 110° C. or less while the values of $\alpha_{Pi}$ and $\alpha_{Bi(B)}$ were located between respective $\alpha_{Pi}$ and between respective $\alpha_{Bi(B)}$ of toluene and 2-butanol as reference solvents was screened; a solvent group C having a boiling point of 110° C. or less while the values of $\alpha_{Pi}$ and $\alpha_{Bi(C)}$ were located between respective $\alpha_{Pi}$ and between respective $\alpha_{Bi(C)}$ of toluene and 2-butanol as reference solvents was screened; and a solvent group D having a boiling point of 110° C. or less while the values of $\alpha_{Pi}$ and $\alpha_{Bi(D)}$ were located between respective $\alpha_{Pi}$ and between respective $\alpha_{Bi(D)}$ of toluene and 2-butanol as reference solvents was screened.

As a result of the above-mentioned solvent screening, it was confirmed that the solvent groups A to D commonly included the diisopropyl ether and 2-methyl-2-butanol, which corresponded to the screened solvents. Thus, the boiling point, vapor pressure and score of each of the diisopropyl ether and 2-methyl-2-butanol were shown in Table 3 below. In addition, the boiling point, vapor pressure and score of each of toluene and 2-butanol, which are the reference solvents, are also shown in Table 3 below.

At this time, the score means the difference between the mixing energy ($\Delta_{\mu B}$) between the solvent and the (meth)acrylate binder and the mixing energy ($\Delta_{\mu P}$) between the solvent and the polymer particles, and it was calculated through the following Equation 4. The score values shown in Table 3 below are values calculated using the acrylate binder A of Table 1, and these score values correspond to Example 1 described later.

$$\text{Score} = \Delta\mu_B - \Delta\mu_P \qquad \text{[Equation 4]}$$

TABLE 3

| CAS No. | Screened solvent | Boiling point (° C.) | Vapor pressure (mmHg) | Score (based on acrylate binder A) |
|---|---|---|---|---|
| 108-88-3 | Toluene (reference solvent) | 110.6 | 28.29 | 0.161 |
| 108-20-3 | Diisopropyl ether | 68.5 | 33.42 | 0.136 |
| 75-85-4 | 2-Methyl-2-butanol | 102.4 | 7.88 | −0.086 |
| 78-92-2 | 2-Butanol (reference solvent) | 99.5 | 13.35 | −0.159 |

(2) Preparation of Composition

The components shown in Table 4 below were mixed to prepare a composition for an optical film. Specifically, the composition of Example 1 used diisopropyl ether among the screened solvents in Table 3, and the composition of Example 2 used 2-methyl-2-butanol among the screened solvents in Table 3 above. In addition, in Examples 1 and 2, 2-butanol and methyl isobutyl ketone were further used in order to appropriately control the aggregation of polymer particles contained in the coating film.

Comparative Examples 1 to 3

The components shown in Table 4 below were mixed to prepare a composition for an optical film, but the screened solvent in Table 3 was not used.

TABLE 4

| (Unit: g) | | Example 1 | Example 2 | Comparative Example 1 | Comparative Example 2 | Comparative Example 3 |
|---|---|---|---|---|---|---|
| Acrylate binder | Hydroxyethyl methacrylate (HEMA) | 2.56 | 5.12 | 2.87 | 5.12 | 2.56 |
| | Pentaerythritol triacrylate (PETA) | 2.56 | — | 2.87 | — | 2.56 |
| | Trimethylolpropane triacrylate (TMPTA) | — | 10.44 | 10.60 | — | — |
| | 11064A | 10.44 | — | 4.41 | 10.44 | 10.44 |
| | Dipentaerythritol hexaacrylate (DPHA) | 10.44 | 10.44 | 5.41 | 10.44 | 10.44 |
| Additive | KIP-100F | 1.36 | 1.36 | 1.36 | 1.36 | 1.36 |
| | Tego-270 | 0.11 | 0.11 | 0.11 | 0.11 | 0.11 |
| | F-477 | 0.05 | 0.05 | 0.05 | 0.05 | 0.05 |
| Solvent | 2-Butanol | 40.4 | 40.4 | 35.45 | 40.4 | 40.4 |
| | Methyl isobutyl ketone (MIBK) | 10.1 | 10.1 | — | 10.1 | — |
| | Isopropyl alcohol (IPA) | — | — | 35.45 | 20.2 | 30.3 |
| | Diisopropyl ether | 20.2 | — | — | — | — |
| | 2-Methyl-2-butanol | — | 20.2 | — | — | — |
| Polymer particles | XX-103BQ | 0.45 | 0.45 | 0.43 | 0.45 | 0.45 |
| | XX-113BQ | 0.75 | 0.75 | 0.75 | 0.75 | 0.75 |
| Silica sol | MA-ST | 0.58 | 0.58 | 0.24 | 0.58 | 0.58 |
| | Total amount | 100 | 100 | 100 | 100 | 100 |

11064A: Urethane acrylate in which pentaerythritol triacrylate (PETA) and hexamethylene diisocyanate (HMDI) are connected via a urethane linkage (SK Entis, molecular weight of 4,000)
KIP-100F: photoinitiator, IGM Resins B.V.
Tego-270: leveling agent, Evonik
F-477: leveling agent, DIC Chemical
XX-103BQ: Polystyrene-Polymethylmethacrylate crosslinked copolymer fine particles, Sekisui Plastics, particle diameter: 2.0 μm, refractive index: 1.515
XX-113BQ: Polystyrene-Polymethylmethacrylate crosslinked copolymer fine particles, Sekisui Plastics, particle diameter: 2.0 μm, refractive index: 1.555
MA-ST: Silica sol, Nissan Chemical, 30% in methanol Experimental Example 1. Preparation of Optical Film The compositions of Examples and Comparative Examples described in Table 4 were respectively coated onto a polyethylene terephthalate (PET) substrate having a thickness of 80 μm, dried and photocured to produce an optical film.

Specifically, each composition was coated onto a polyethylene terephthalate substrate with a #12 mayer bar, and then dried at a temperature of 60° C. for 2 minutes, and UV cured. At this time, the UV lamp used an H bulb, and the curing reaction was carried out under a nitrogen atmosphere. The amount of UV light irradiated during curing was 150 mJ/cm$^2$. In addition, the thickness of the cured film is shown in Table 5 below.

TABLE 5

| | Example 1 | Example 2 | Comparative Example 1 | Comparative Example 2 | Comparative Example 3 |
|---|---|---|---|---|---|
| Thickness (μm) | 5 | 4.5 | 4.5 | 5 | 5 |

2. Analysis of Residual Solvent in Optical Film

The residual solvent in the optical film was analyzed through VOC (Volatile Organic Component) volatilized from the optical film through TD GC-Mass Chromatography. Toluene diluted in methanol (concentration: 4 ug/uL) was used as a standard solution.

Specifically, 1 uL of the standard solution was injected into a Tenax tube, then capped and analyzed by TD to collect peak area information of the standard solution. Thereafter, a film sample whose mass was measured was placed in a hollow tube, heated at 180° C. for 30 minutes, and then the volatilized component was analyzed by TD GC/MS Chromatography to confirm the peak area of the substance. Then, the volatilized VOC was calculated through the following Equation 5, and the content of the residual solvent in the optical film was derived through this, and the results are shown in Table 6 below.

$$VOC_{compound} = [(A_{compound}/A_{std}) \times C_{std}]/W_{sample} \quad \text{[Equation 5]}$$

in the Equation 5, $VOC_{compound}$ is the VOC value (μg/g) of an individual substance generated in the measurement sample, $A_{compound}$ is the chromatogram area of the peak of the individual substance of the measurement sample, $A_{std}$ is the peak area of the toluene standard solution, $C_{std}$ is the mass (about 4 μg) of toluene injected using toluene standard solution, and $W_{sample}$ is the weight (g) of the measurement sample.

Meanwhile, the measurement conditions for TD GC-Mass Chromatography are as follows.

GC oven: heated from 50° C. to 300° C. at a rate of 10° C./min

Column: HP-5MS (60 m×0.32 mm×0.25 μm I.D)

TABLE 6

| (Unit: μg/g) | Example 1 | Example 2 | Comparative Example 1 | Comparative Example 2 | Comparative Example 3 |
|---|---|---|---|---|---|
| Residual solvent | 6 | 14 | 0 | 0 | 0 |

According to Table 6, it was confirmed that in Examples 1 and 2, 6 μg/g or more of the solvent remained in the optical film, but no solvent remained in Comparative Examples 1 to 3. Accordingly, in Comparative Examples 1 to 3, as the polymer particles are not swelled by the solvent and thus a fine void is created between the binder and the polymer particles. Thus, it can be predicted that the haze variation before and after high temperature and high humidity conditions will increase significantly.

3. Measurement of Transmittance and Haze Before and after Moisture and Heat Resistance Evaluation Initial transmittance and haze were measured for optical films each prepared using the compositions of Examples and Comparative Examples. Specifically, using a haze meter (HM-150, light source A, manufactured by Murakami), the transmittance was measured according to JIS K7361, and haze was measured according to JIS K 7136. The results are shown as initial transmittance and initial haze (Hf), respectively, in Table 7 below Thereafter, the optical film was placed in a chamber at a temperature of 85° C. and a humidity of 85% and allowed to stand for 24 hours, and then, haze and transmittance were measured. The results are shown as transmittance and haze (Hi) after moisture and heat resistance evaluation, respectively, in Table 7 below.

Further, the difference between the initial haze (Hf) and the haze (Hi) after the moisture and heat resistance evaluation was calculated, and the degree of haze evaluation before and after moisture and heat resistance evaluation was expressed as a haze variation (ΔH) in Table 7 below.

TABLE 7

| (Unit: %) | Example 1 | Example 2 | Comparative Example 1 | Comparative Example 2 | Comparative Example 3 |
|---|---|---|---|---|---|
| Initial transmittance | 91.3 | 91.4 | 91.5 | 91.3 | 91.5 |
| Transmittance after moisture and heat resistance evaluation | 92.4 | 92.4 | 91.2 | 92.4 | 92.1 |

TABLE 7-continued

| (Unit: %) | Example 1 | Example 2 | Comparative Example 1 | Comparative Example 2 | Comparative Example 3 |
|---|---|---|---|---|---|
| Initial haze (Hf) | 4.1 | 5.6 | 3 | 4.9 | 3.1 |
| Haze (Hi) after moisture and heat resistance evaluation | 4.2 | 5.6 | 3.7 | 5.8 | 4.2 |
| Haze variation (ΔH) | 0.1 | 0 | 0.7 | 0.9 | 1.1 |

According to Table 7, it was confirmed that the optical films formed of the compositions of Examples 1 and 2 containing the screened solvent has a significantly low haze variation before and after the moist heat resistance evaluation, as compared with the optical films formed of the compositions of Comparative Examples 1 to 3 not containing the screened solvent.

What is claimed is:

1. A composition comprising polymer particles, a (meth) acrylate binder and a solvent, wherein the solvent includes a solvent screened using a solvent-polymer particle interaction parameter $\alpha_{Pi}$ calculated according to the following Equation 1 and a solvent-(meth)acrylate binder interaction parameter $\alpha Bi$ calculated according to the following Equation 2, wherein the screened solvent includes at least one selected from the group consisting of diisopropyl ether, 2-methyl-2-butanol, diethylmethylamine, benzene, and trichloroethene, wherein the solvent-polymer particle interaction parameter $\alpha_{Pi}$ of the screened solvent is −0.50 to 0.50, and wherein the solvent-(meth)acrylate binder interaction parameter $\alpha Bi$ of the screened solvent is −0.10 to 0.20, $$\alpha_{Pi} \equiv \sum_{j=1}^{N_P} a_j \Delta\mu^s_{ji} \qquad [\text{Equation 1}]$$

in the Equation 1, $N_P$ means the number of types of polymers constituting the polymer particles, $a_j$ means a ratio of a weight of each polymer particle to the total weight of the entire polymer particles, $\Delta\mu_{ji}$ means a mixing energy of the solvent I to the polymer particles j, and $\Delta\mu^s_{ji}$ is a standardized value of the $\Delta\mu_{ji}$, $$\alpha_{Bi} \equiv \sum_{k=1}^{N_B} a_k \Delta\mu^s_{ki} \qquad [\text{Equation 2}]$$

in the Equation 2, $N_B$ means the number of types of (meth)acrylate binders, $a_k$ means a ratio of a weight of each (meth)acrylate binder to the total weight of the entire (meth)acrylate binder, $\Delta\mu_{ki}$ means a mixing energy of the solvent I to the (meth)acrylate binder k, and $\Delta\mu^s_{ki}$ is a standardized value of the $\Delta\mu_{ki}$, wherein the mixing energy of the solvent to the polymer particles and the mixing energy of the solvent to the (meth)acrylate binder are values calculated using the COSMO-RS theory.

2. The composition according to claim 1, wherein $\Delta\mu^s_{ji}$ is represented by the following Equation 1-1, and $\Delta\mu^s_{ki}$ is represented by the following Equation 2-1:

$$\Delta\mu^s_{ji} = (\Delta\mu_{ji} - M_j)/\sigma_j \qquad [\text{Equation 1-1}]$$

in the Equation 1-1, $\Delta\mu_{ji}$ means the mixing energy of the solvent I to the polymer particles j, $M_j$ means an average of the $\Delta\mu_{ji}$, and $\sigma_j$ means a standard deviation of the $\Delta\mu_{ji}$, $$\Delta\mu^s_{ki} = (\Delta\mu_{ki} - M_k)/\sigma_k \qquad [\text{Equation 2-1}]$$

in the Equation 2-1, $\Delta\mu_{ki}$ means the mixing energy of the solvent I to the (meth)acrylate binder k, $M_k$ means an average of the $\Delta\mu_{ki}$, and $\sigma_k$ means a standard deviation of the $\Delta\mu_{ki}$.

3. The composition according to claim 1, wherein the solvent-polymer particle interaction parameter $\alpha_{Pi}$ of the screened solvent is −0.45 to 0.45, and wherein the solvent-(meth)acrylate binder interaction parameter $\alpha_{Pi}$ of the screened solvent is −0.05 to 0.15.

4. The composition according to claim 1, wherein the screened solvent has a boiling point of 68.5 to 150° C.

5. The composition according to claim 1, wherein the polymer particles include at least one selected from the group consisting of polyethylene (PE), polyvinylfluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), ethylene vinyl acetate (EVA), polymethyl methacrylate (PMMA), poly(l-butene), poly(4-methylpentene), polystyrene, polyvinylpyridine, polybutadiene, polyisoprene, polychloroprene, styrene-acrylonitrile copolymer (SAN), styrene-acrylate copolymer, styrene-methacrylate copolymer, styrene-methylmethacrylate copolymer, acrylonitrile-butadiene-styrene terpolymer, ethylene-methacrylic acid copolymer, styrene-butadiene rubber, nitrile rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resin, polyphenylene oxide, polyethylene terephthalate, polybutylene terephthalate, polydihydroxymethylcyclohexyl terephthalate, cellulose ester, polycarbonate, polyamide, polyimide, and polyarylene.

6. The composition according to claim 1, wherein the (meth)acrylate binder is at least one selected from the group consisting of (meth)acrylate-based monomers, (meth)acrylate-based oligomers and (co)polymers of (meth)acrylate-based monomers.

7. A method for preparing the composition of claim 1 comprising the steps of:
- screening the solvent using the solvent-polymer particle interaction parameter $\alpha_{P_i}$ as set forth in the Equation 1 and the solvent-(meth)acrylate binder interaction parameter $\alpha_{P_i}$ as set forth in the Equation 2; and
- preparing the composition including the screened solvent, the polymer particles and the (meth)acrylate binder.

8. An optical film comprising a cured product of the composition of claim 1.

9. The optical film according to claim 8, wherein the optical film has a haze variation (ΔH) according to the following Equation 3 of 0.4% or less $$\Delta H(\%) = |Hf - Hi| \qquad \text{[Equation 3]}$$

in the Equation 3,

Hf is a haze of the optical film after maintaining the optical film at a temperature of 85° C. and a humidity of 85% for 24 hours, and Hi is an initial haze of the optical film before being subjected to a temperature of 85° C. and a humidity of 85% for 24 hours.

10. The optical film according to claim 8, wherein the optical film has a thickness of 1 to 100 μm.

11. A display device comprising the optical film according to claim 8.

* * * * *